(12) United States Patent
Tsuchitoi (10) Patent No.: US 8,780,387 B2
(45) Date of Patent: Jul. 15, 2014

(54) SYSTEM, INFORMATION PROCESSING APPARATUS, AND PRINTING APPARATUS

(75) Inventor: Naoki Tsuchitoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 12/861,833

(22) Filed: Aug. 24, 2010

(65) Prior Publication Data

US 2011/0069343 A1 Mar. 24, 2011

(30) Foreign Application Priority Data

Sep. 18, 2009 (JP) ................................. 2009-218001
Jul. 13, 2010 (JP) ................................. 2010-159168

(51) Int. Cl.
*G06F 15/00* (2006.01)
*H04N 1/04* (2006.01)
*G03G 15/20* (2006.01)

(52) U.S. Cl.
USPC ........ 358/1.15; 358/1.14; 358/1.13; 358/474; 399/70

(58) Field of Classification Search
USPC ............................ 399/70; 358/474, 1.13, 1.15
See application file for complete search history.

(56) References Cited

U.S. PATENT DOCUMENTS

| | | | |
|---|---|---|---|
| 6,636,710 B2 * | 10/2003 | Oyaide | 399/70 |
| 6,906,813 B1 | 6/2005 | Tuchitoi et al. | |
| 7,246,153 B2 | 7/2007 | Tsuchitoi | |
| 2004/0022550 A1 * | 2/2004 | Okada | 399/67 |
| 2004/0190048 A1 * | 9/2004 | Egawa et al. | 358/1.15 |
| 2005/0141030 A1 | 6/2005 | Tuchitoi et al. | |
| 2006/0274348 A1 * | 12/2006 | Suzuki | 358/1.13 |
| 2007/0097424 A1 * | 5/2007 | Mizuno | 358/1.15 |

FOREIGN PATENT DOCUMENTS

| | | |
|---|---|---|
| JP | 2000-272203 A | 10/2000 |
| JP | 2003-84935 A | 3/2003 |
| JP | 2006-227395 A | 8/2006 |
| JP | 2009-140069 A | 6/2009 |

OTHER PUBLICATIONS

Japanese Office Action dated Apr. 28, 2014 issued in corresponding Japanese Patent Application No. 2010-159168.

* cited by examiner

*Primary Examiner* — King Poon
*Assistant Examiner* — Temitayo Folayan
(74) *Attorney, Agent, or Firm* — Fitzpatrick, Cella, Harper & Scinto (57) ABSTRACT

The present invention provides a mechanism capable of executing print processing by appropriately selecting, in accordance with the power state of a printing apparatus, the first printing mode in which the printing apparatus performs print processing regardless of whether a predetermined condition is satisfied, or the second printing mode in which it performs print processing when the predetermined condition is satisfied.

8 Claims, 7 Drawing Sheets

901 — PRINTING APPARATUS IS IN DEEP SLEEP MODE NOW.

IF YOU SUSPEND TRANSMISSION OF JOB UNTIL DEVICE BECOMES ACTIVE, YOU CAN REDUCE POWER CONSUMPTION BY xx W/h AND $CO_2$ EMISSION BY yy g.

902 — NORMAL PRINTING MODE

903 — BATCH PRINTING MODE

FIG. 7

| STATE | POWER CONSUMPTION (W/h) | ENERGIZED PORTIONS OF PRINTING APPARATUS |
|---|---|---|
| NORMAL STATE | SEVERAL HUNDRED W | ALL |
| SLEEP STATE | SEVERAL TEN W | 111 TO 117, TEMPERATURE MEASUREMENT PORTION OF 120, AND 123 |
| DEEP SLEEP STATE | SEVERAL W | 111, 116, 117, TEMPERATURE MEASUREMENT PORTION OF 120, AND 123 |

FIG. 8

SYSTEM, INFORMATION PROCESSING APPARATUS, AND PRINTING APPARATUS

BACKGROUND OF THE INVENTION

1. Field of the Invention

The present invention relates to a system, information processing apparatus, and printing apparatus.

2. Description of the Related Art

In an effort to reduce power consumption in a printing apparatus, for example, there is a technique to stop the power supply to a portion which consumes power when the printing apparatus stands still for a predetermined time. A technique of fixing a coloring material (toner) onto a printing medium (paper) by a fixing unit using heat and pressure is popular in a printing apparatus using the electrophotographic technique. In this case, power consumption can be reduced by stopping the power supply to the fixing unit. Upon accepting a printing instruction from the outside, this printing apparatus energizes the fixing unit at the same time as image processing, and after raising the heater temperature, starts printing. The longer the apparatus has not accepted a printing instruction, the longer a state (also called a "sleep state") in which the fixing unit is not energized continues. As a result, the fixing unit is cooled to room temperature. Wasteful electric energy is consumed to heat the fixing unit to a temperature capable of fixing.

To solve this problem, a technique is proposed to suppress amount of electric energy consumed during the lifecycle of the overall apparatus by decreasing the ON/OFF switching count of the fixing unit. For example, Japanese Patent Laid-Open No. 2000-272203 (patent reference 1) discloses a technique of decreasing the ON/OFF switching count of the fixing unit by performing print processing not immediately after receiving a printing instruction but only after a predetermined condition is satisfied.

In the technique disclosed in patent reference 1, the user needs to select either a printing mode in which the printing apparatus quickly follows a printing instruction, or a printing mode in which it stands by until a predetermined condition is satisfied. However, the user does not always select a proper printing mode. For example, if he selects the printing mode in which the printing apparatus quickly follows a printing instruction though the printing apparatus is in a power-saving state, the power-saving state is canceled, failing in power saving of the printing apparatus. If he selects the printing mode in which the printing apparatus suspends a printing instruction though the printing apparatus is in a standby state in which it can quickly execute print processing, execution of print processing following the printing instruction is delayed.

SUMMARY OF THE INVENTION

The present invention has been made to solve the above problems, and has as its object to provide a mechanism capable of executing print processing by appropriately selecting, in accordance with the power state of a printing apparatus, the first printing mode in which the printing apparatus performs print processing regardless of whether a predetermined condition is satisfied, or the second printing mode in which it performs print processing when the predetermined condition is satisfied.

According to one aspect of the present invention, there is provided a system comprising a printing apparatus which performs print processing on a printing medium, and an information processing apparatus which transmits a printing instruction to the printing apparatus, the information processing apparatus comprising: a first reception unit configured to receive information on power consumption of the printing apparatus from the printing apparatus; a selection unit configured to select, based on the information on power consumption that has been received by the first reception unit, one of a first printing mode in which the printing apparatus performs print processing regardless of whether a predetermined condition is satisfied, and a second printing mode in which the printing apparatus performs print processing when the predetermined condition is satisfied; and a first transmission unit configured to transmit, to the printing apparatus, the printing instruction to which attribute information corresponding to a printing mode selected by the selection unit is added, and the printing apparatus comprising: a second transmission unit configured to transmit the information on power consumption of the printing apparatus to the information processing apparatus; a second reception unit configured to receive the printing instruction from the information processing apparatus; and a control unit configured to control to, when the attribute information added to the printing instruction received by the second reception unit indicates the first printing mode, perform print processing corresponding to the printing instruction received by the second reception unit, and when the attribute information added to the printing instruction received by the second reception unit indicates the second printing mode and the predetermined condition is satisfied, perform print processing corresponding to the printing instruction received by the second reception unit.

According to another aspect of the present invention, there is provided an information processing apparatus which transmits a printing instruction to a printing apparatus that performs print processing on a printing medium, the information processing apparatus comprising: a reception unit configured to receive information on power consumption of the printing apparatus from the printing apparatus; a selection unit configured to select, based on the information on power consumption that has been received by the reception unit, one of a first printing mode in which the printing apparatus performs print processing regardless of whether a predetermined condition is satisfied, and a second printing mode in which the printing apparatus performs print processing when the predetermined condition is satisfied; and a transmission unit configured to transmit, to the printing apparatus, the printing instruction to which attribute information corresponding to a printing mode selected by the selection unit is added.

According to still another aspect of the present invention, there is provided a printing apparatus which performs print processing on a printing medium, comprising: a transmission unit configured to transmit information on power consumption of the printing apparatus to an information processing apparatus; a reception unit configured to receive a printing instruction from the information processing apparatus; and a control unit configured to control to, when attribute information added to the printing instruction received by the reception unit indicates a first printing mode in which the printing apparatus performs print processing regardless of whether a predetermined condition is satisfied, perform print processing corresponding to the printing instruction received by the reception unit regardless of whether the predetermined condition is satisfied, and when the attribute information added to the printing instruction received by the reception unit indicates a second printing mode in which the printing apparatus performs print processing when the predetermined condition is satisfied, and the predetermined condition is satisfied, perform print processing corresponding to the printing instruction received by the reception unit.

The present invention can provide a mechanism capable of executing print processing by appropriately selecting, in accordance with the power state of a printing apparatus, the first printing mode in which the printing apparatus performs print processing regardless of whether a predetermined condition is satisfied, or the second printing mode in which it performs print processing when the predetermined condition is satisfied.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will be described in detail below with reference to the accompanying drawings.

First Embodiment

Figure 1:
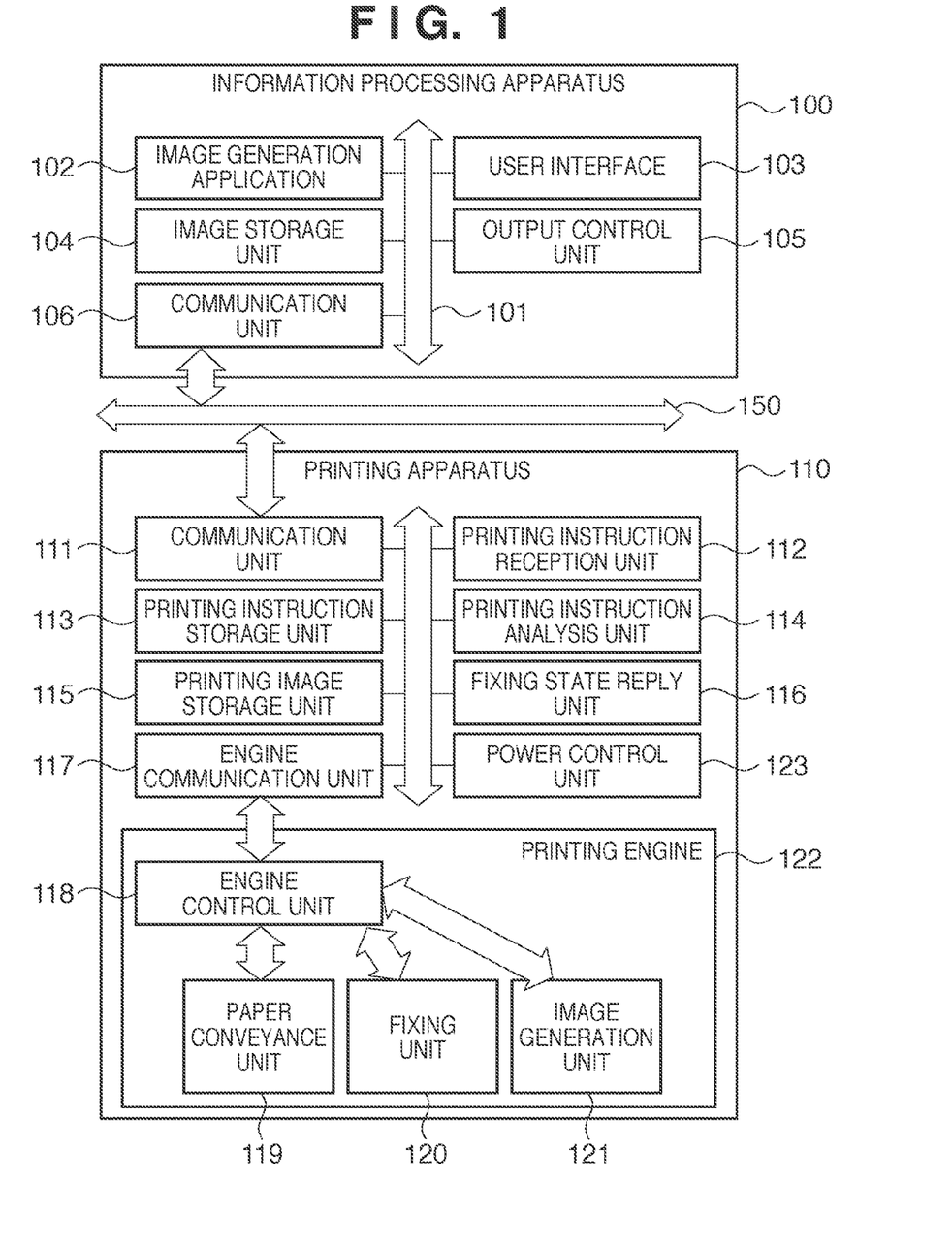
FIG. 1 is a block diagram that depicts the functional arrangements of an information processing apparatus 100 and printing apparatus 110 according to the first and second embodiments.

FIG. 1 is a block diagram that depicts an arrangement according to the first embodiment of the present invention. A printing system according to the first embodiment includes a printing apparatus 110 (for example, laser beam printer) which performs print processing on a printing medium, and an information processing apparatus 100 (for example, host computer) which transmits a printing instruction to the printing apparatus 110 to perform print processing. The printing apparatus 110 and information processing apparatus 100 are connected by a predetermined communication medium 150. The communication medium 150 can be a USB interface, Ethernet, or the like.

The information processing apparatus 100 includes an internal bus 101, image generation application 102, user interface 103 (information providing unit and selection unit), image storage unit 104, output control unit 105, and communication unit 106 (first reception unit and first transmission unit). The internal bus 101 connects respective modules. The image generation application 102 generates image data. The user interface 103 provides a user interface that provides various kinds of information to the user so that he can recognize them, and allows him to perform a manipulation such as selection based on the provided information. The image storage unit 104 temporarily stores image data. The output control unit 105 determines a method of transmitting an image. The communication unit 106 communicates with the printing apparatus 110.

The printing apparatus 110 includes a communication unit 111 (second reception unit), printing instruction reception unit 112, printing instruction storage unit 113, printing instruction analysis unit 114, printing image storage unit 115, fixing state reply unit 116 (second transmission unit), engine 122, engine communication unit 117, power control unit 123, engine control unit 118, paper conveyance unit 119, image generation unit 121, and fixing unit 120. The communication unit 111 communicates with the information processing apparatus 100. The printing instruction reception unit 112 receives a printing instruction among communication contents. The printing instruction storage unit 113 temporarily stores image data transmitted as a printing instruction. The printing instruction analysis unit 114 analyzes a printing instruction. The printing image storage unit 115 temporarily stores image data generated by the printing instruction analysis unit 114. The fixing state reply unit 116 sends back the state (for example, energization state or temperature) of the fixing unit to the information processing apparatus 100. The engine 122 actually prints according to a known printing technique such as the electrophotographic technique. The engine communication unit 117 communicates with the engine 122. The power control unit 123 controls the power state of the printing apparatus. The engine control unit 118 is incorporated in the engine 122, communicates with the outside, and controls the engine. The paper conveyance unit 119 feeds a paper medium on which a printing result is to be printed, and discharges the printing result from the apparatus. The image generation unit 121 rasterizes image data stored in the printing image storage unit 115 into raster data, generates an image according to the electrophotographic technique, and prints it on a paper medium. The fixing unit 120 fixes an image (printing element) printed on a printing medium by heat and pressure.

Figure 8:
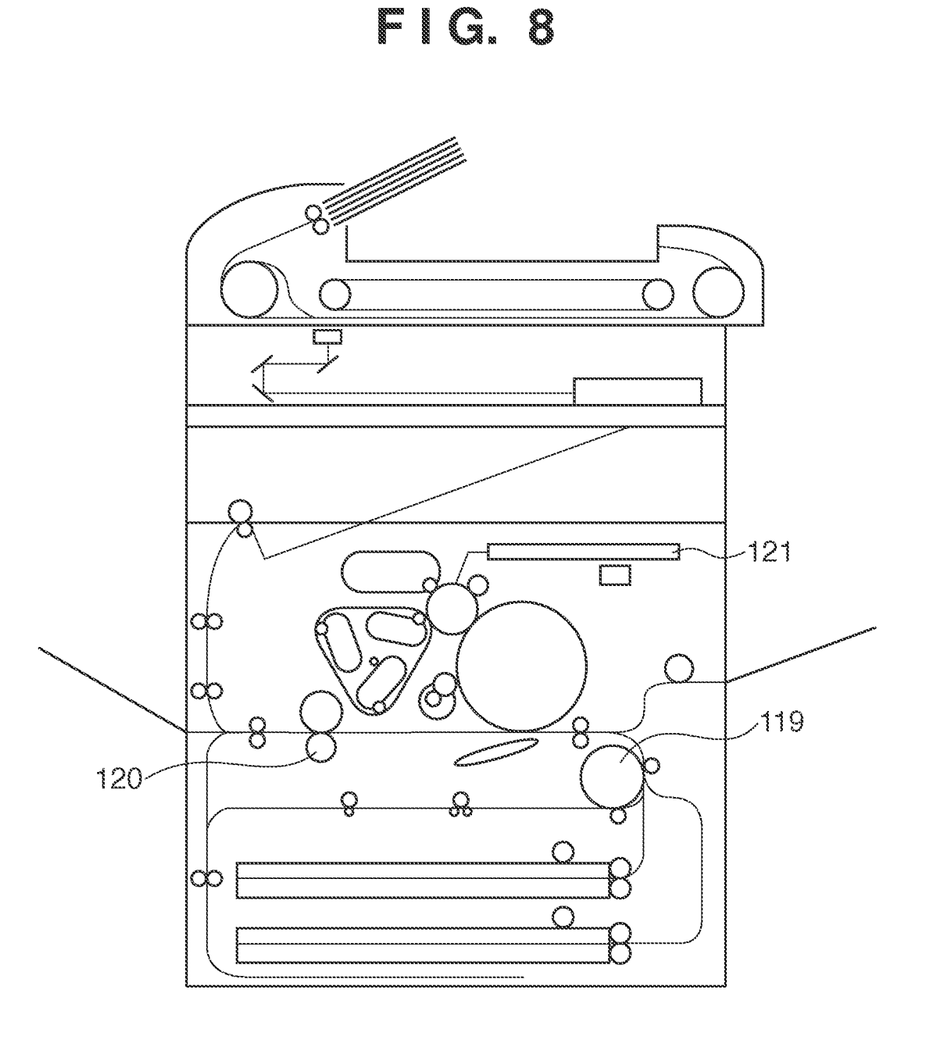
FIG. 8 is a view schematically that depicts the arrangement of the printing apparatus 110.

FIG. 8 is a schematic view that depicts the arrangement of the printing apparatus 110 according to the first embodiment. The printing apparatus 110 includes the paper conveyance unit 119, fixing unit 120, and image generation unit 121. In the electrophotographic technique, the fixing unit 120 assumes a conventional method of fixing an image onto a printing medium (paper) using a coloring material (toner), heat, and drum pressure. Since electric energy is converted into heat to use the heat, the fixing unit 120 consumes most of power of the whole apparatus. The fixing unit 120 can measure its temperature to control it, and can transfer the measured temperature information to the fixing state reply unit 116 via the engine control unit 118. The power control unit 123 manages the power state of each portion in the printing apparatus 110.

Figure 7:
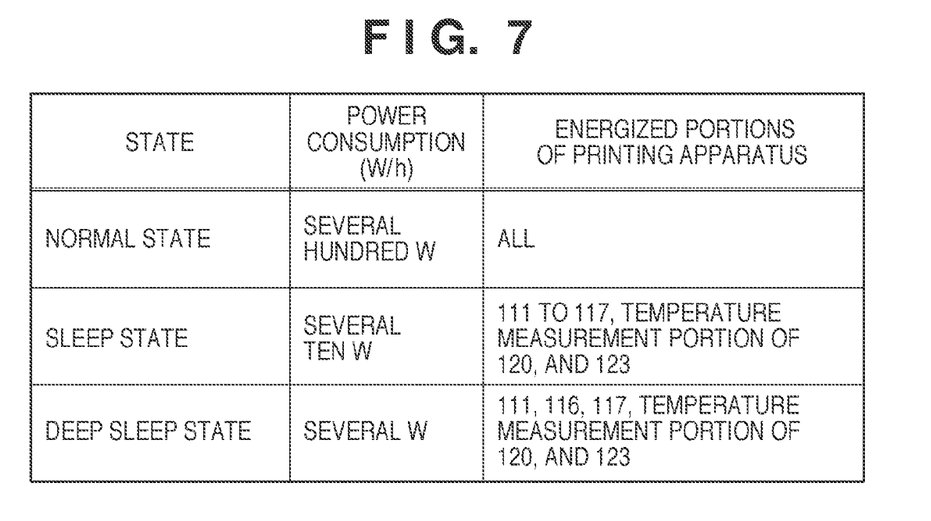
FIG. 7 is a table that depicts power consumption and energized portions in each operation state.

FIG. 7 is a table that depicts power consumption and energized portions in each operation state. In a normal state, an image can be quickly printed, and all the portions of the printing apparatus 110 are energized. In this case, the fixing unit consumes electric energy most, and consumes power of several hundred W/h.

The printing apparatus shifts to a sleep state when the engine 122 has not been used for a while. In this state, energized portions are the communication unit 111, the printing instruction reception unit 112, the printing instruction storage unit 113, the printing instruction analysis unit 114 which analyzes a printing instruction, the printing image storage unit 115, the fixing state reply unit 116, the engine control unit 118, the temperature measurement portion of the fixing unit 120, and the power control unit 123. In this state, the printing apparatus accepts a printing instruction and thus consumes power (several ten W) large enough to use the computer.

In a deep sleep state, power consumption is minimum, and the printing apparatus has an ability to only send back a state in response to a limited request from a network, and consumes minimum power (several W). In this state, the communication unit 111, the fixing state reply unit 116, the engine control unit 118, the temperature measurement portion of the fixing unit 120, and the power control unit 123 are energized.

The operation state of the printing apparatus 110 will be explained. The user generates an image he wants, using the image generation application 102 and user interface 103. When the user wants to output the image to the printing apparatus, he performs a predetermined manipulation (for example, presses a printing button) via the user interface 103, issuing an output instruction. Upon receiving the output instruction, the image generation application 102 issues an image output instruction to the output control unit 105.

[Operation Procedures of Information Processing Apparatus 100 (FIG. 2)]

Figure 2:
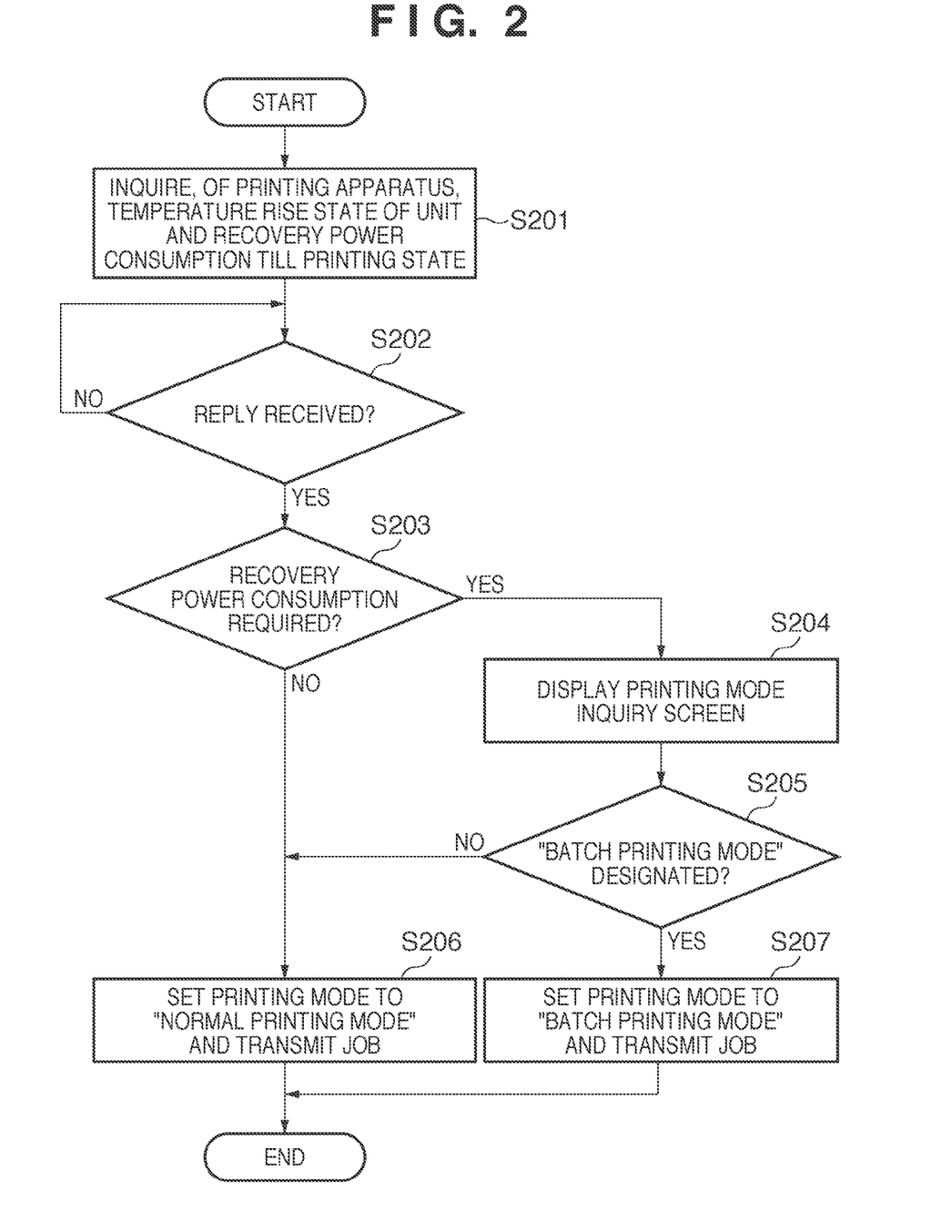
FIG. 2 is a flowchart that depicts the operation procedures of the information processing apparatus 100.

The output control unit 105 of the information processing apparatus 100 starts an operation upon receiving a printing instruction from the image generation application 102, and ends it upon completion of a series of processes.

In step S201, the output control unit 105 inquires, of the printing apparatus, the temperature state of the fixing unit and recovery power consumption till the printing state. This inquiry command can be expressed as, for example, "INQUIRE FIX-STATUS". "INQUIRE" indicates an inquiry command, and "FIX-STATUS" indicates the state of the fixing unit. In this example, the inquiry command is formed from a simple character string, but may also adopt a packet format or a known data format such as ASN.1 (Abstract Syntax Notation One).

In step S202, the output control unit 105 determines whether it has received a reply to the inquiry command from the printing apparatus 110. The output control unit 105 stands by until it receives a reply. The inquiry result can be expressed by, for example:

"FIX-STATUS=COLD
RECOVER_WH=83"

"FIX-STATUS" is a character string which returns the state of the fixing unit, and "COLD" is a character string indicating that the fixing unit is in a cold state (so-called sleep state). When the fixing unit is at a temperature capable of fixing (normal state), it is assumed that a character string "WARM" is sent back. "RECOVER_WH" on the lower line represents the numerical value of a power consumption amount (Wh) used for recovery. This example assumes that power of 1,000 W is kept consumed for 5 min for recovery, and a power consumption amount of 1000×5/60=83 (Wh) is required.

Figure 3:
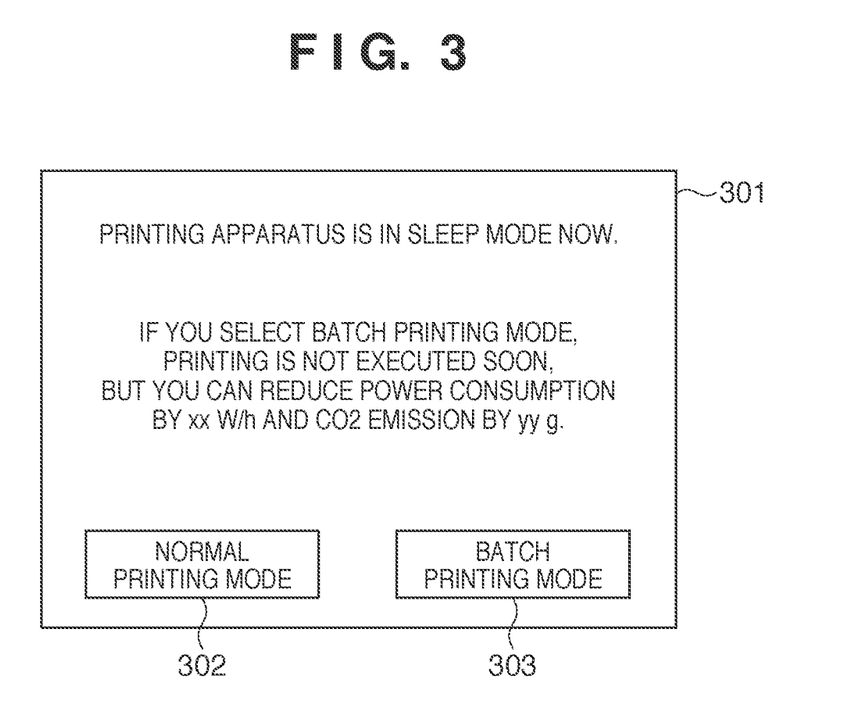
FIG. 3 is a view exemplifying a printing mode inquiry screen.

If the output control unit 105 determines in step S202 that it has received a reply, it determines in step S203 whether recovery power consumption is required, that is, whether the character string "COLD" has been sent back in the reply to the inquiry command. If the output control unit 105 determines that recovery power consumption is required (that is, sleep state), it displays a printing mode inquiry screen on the user interface 103 in step S204, thereby prompting the user to take the next action. FIG. 3 exemplifies this inquiry screen. Reference numeral 301 denotes a display dialog; 302, a normal printing mode selection button; and 303, a batch printing mode selection button. As a power consumption amount xx in the display, "83" in "RECOVER_WH" mentioned above is sent back. A value yy in $CO_2$ emission conversion can also be displayed. The $CO_2$ emission can be calculated from the power consumption amount using a $CO_2$ emission coefficient (0.36 kg-$CO_2$/kWh). When the user presses the normal printing mode selection button 302 or batch printing mode selection button 303, a branch to step S207 or step S206 is determined. Note that settings of various properties, generation of PDL (Page Description Language) data corresponding to an image, and generation of attribute information exist until image data is actually transmitted in response to a printing instruction. However, these processes are the same as the conventional ones, and a description thereof will be omitted.

In step S205, the output control unit 105 determines whether the user has selected the "batch printing mode" (second printing mode) via the user interface 103. The user selects to save power consumed by printing or shorten the printing time.

If the output control unit 105 determines in step S205 that the user has selected the "batch printing mode" via the user interface 103, that is, he gives priority to saving of power consumption, the process advances to step S207. If the user has selected not the "batch printing mode" but the "normal printing mode" (first printing mode), that is, he gives priority to shortening of the printing time, the process advances to step S206. If the output control unit 105 determines in step S203 that no recovery power consumption is required (normal state), the process advances to step S206.

In step S206, the output control unit 105 sets the printing mode to the "normal printing mode", and transmits a job to the printing apparatus, similar to a conventional system. To the contrary, in step S207, the output control unit 105 sets the printing mode to the "batch printing mode", and transmits a job to the printing apparatus. This can minimize power consumption for recovery.

[Operation Procedures of Printing Apparatus 110 (FIG. 4)]

Figure 4:
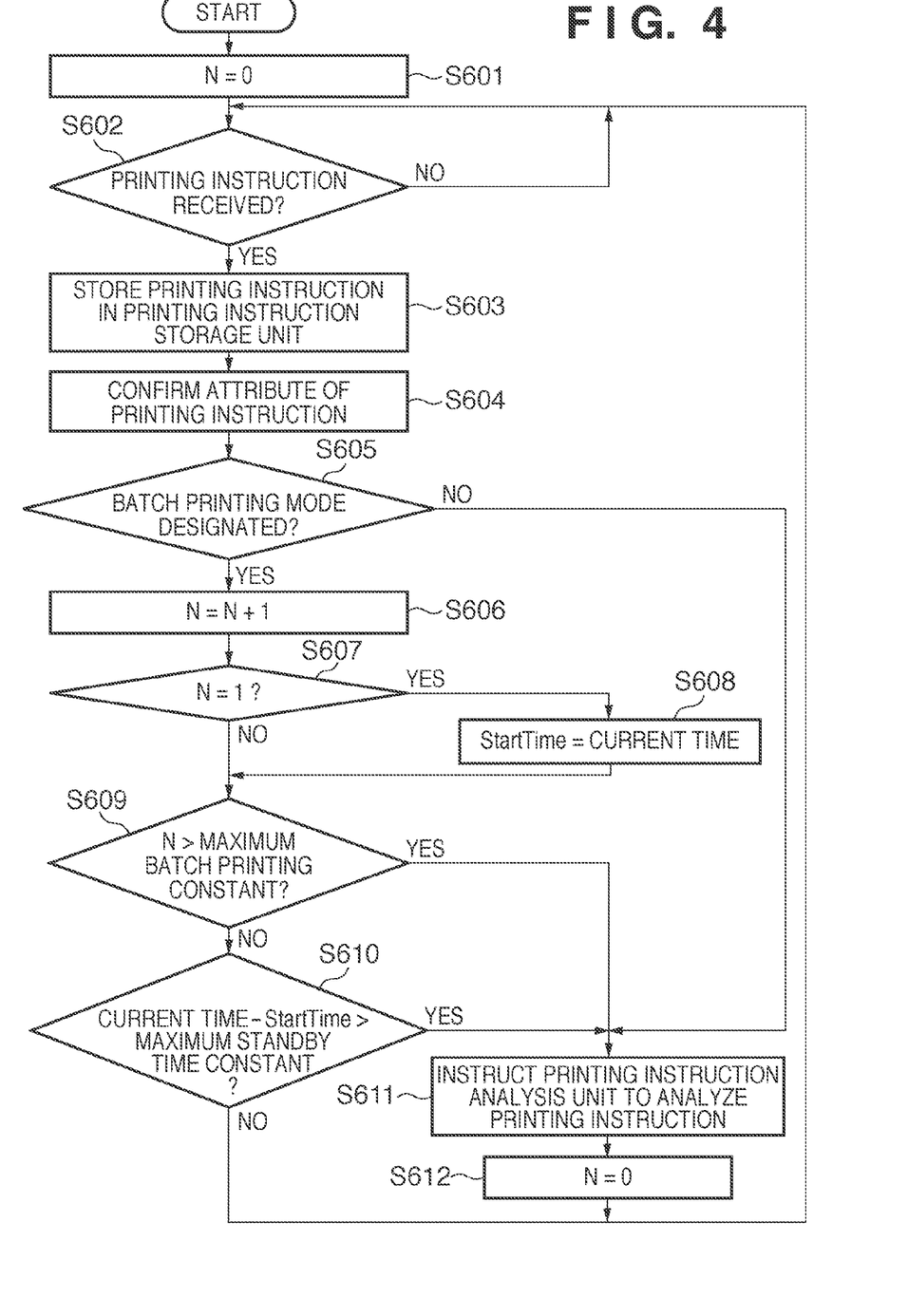
FIG. 4 is a flowchart that depicts the operation procedures of the printing apparatus 110.

Upon receiving an inquiry corresponding to step S201 of FIG. 2 from the information processing apparatus 100, the printing apparatus 110 performs reply processing corresponding to step S202 of FIG. 2. Then, the printing instruction reception unit 112 performs the following processing. Note that the printing instruction reception unit 112 starts an operation upon turning on the printing apparatus 110, and continues it until the system is shut down or power supply stops.

In step S601, the printing instruction reception unit 112 initializes a variable N. The variable N indicates the number of printing instructions that are reserved in the printing apparatus 110 and have not been executed for printing. In step S602, the printing instruction reception unit 112 determines whether it has received a printing instruction. If the printing instruction reception unit 112 has not received a printing instruction, it continues step S602 until it receives a printing instruction. If the printing instruction reception unit 112 has received a printing instruction, it stores the printing instruction in the printing instruction storage unit 113 in step S603. The printing instruction contains a large amount of PDL data, so it is assumed that this storage step and the following steps are parallelly executed.

In step S604, the printing instruction reception unit 112 confirms attribute information of the printing instruction. If the printing instruction reception unit 112 determines in step S605 that the attribute information indicates the "batch printing mode" as a result of the confirmation, it increments the variable N by one in step S606. If N=1 in step S607, the printing instruction reception unit 112 saves, in a variable StartTime in step S608, the reception time (current time) of a job which is reserved first. In step S609, the printing instruction reception unit 112 determines whether N exceeds a maximum batch printing constant. The maximum batch printing constant indicates the maximum number of printing instructions reserved when executing the batch printing mode. If N does not exceed the maximum batch printing constant, the printing instruction reception unit 112 determines in step S610 whether the time difference between the current time and StartTime exceeds a maximum standby time constant. The maximum standby time constant indicates a maximum time for which a printing instruction is reserved. Upon the lapse of a predetermined time after storing the first printing instruction, the printing instruction can be output even if the variable N does not exceed the maximum batch printing constant. If the time difference does not exceed the maximum standby time constant, the process returns to step S602 and waits until the next printing job is received. If the printing instruction reception unit 112 determines in step S609 that the variable N exceeds the maximum batch printing constant, or determines in step S610 that the time difference exceeds the maximum standby time constant, the process advances to step S611.

In step S611 which is a process when performing printing, the printing instruction reception unit 112 instructs the printing instruction analysis unit 114 to analyze the printing instruction. An image to be printed is stored in the printing image storage unit 115, transferred to the engine 122 via the engine communication unit 117, and output onto an actual printing medium. The series of operations is the same as those in a conventional printing apparatus. In step S612, the printing instruction reception unit 112 initializes the variable N.

If the user does not designate the batch printing mode in step S605, the process advances to step S611. In this case, not the batch printing mode but the normal printing mode in which printing is done, as needed, is selected regardless of the temperature state of the fixing unit 120.

In the above description, print processing in the batch printing mode is executed upon receiving a predetermined number of printing instructions (predetermined condition). Instead, the print processing may be done upon the lapse of a predetermined time.

Second Embodiment

In the first embodiment, the information processing apparatus 100 always transmits a printing instruction to the printing apparatus 110 regardless of the processing state of the information processing apparatus 100. In general, recent printing apparatuses save power of their entire controllers for further reduction of power consumption. In an arrangement for this purpose, power supply to the printing instruction reception unit 112, printing instruction storage unit 113, and printing instruction analysis unit 114 shown in FIG. 1 is stopped to reduce power consumption of the controller. In addition, only minimum portions are energized (this state will be called a deep sleep state), and when the printing apparatus 110 receives a printing instruction, the communication unit 111 detects it, and the printing instruction reception unit 112, printing instruction storage unit 113, and printing instruction analysis unit 114 are energized. In the deep sleep state, only part of the controller is energized, so power consumption can be suppressed to about several W/h. In the first embodiment, however, a printing instruction is transmitted regardless of which of the batch printing mode or normal printing mode is set. Thus, the controller is energized every time the printing instruction is received. To further reduce power consumption, the second embodiment will describe a method of minimizing energization to the controller. The arrangement of the second embodiment is the same as that in the first embodiment, and only some operation procedures by an output control unit 105 are changed.

[Operation Procedures of Information Processing Apparatus 100 (FIG. 5)]

Figure 5:
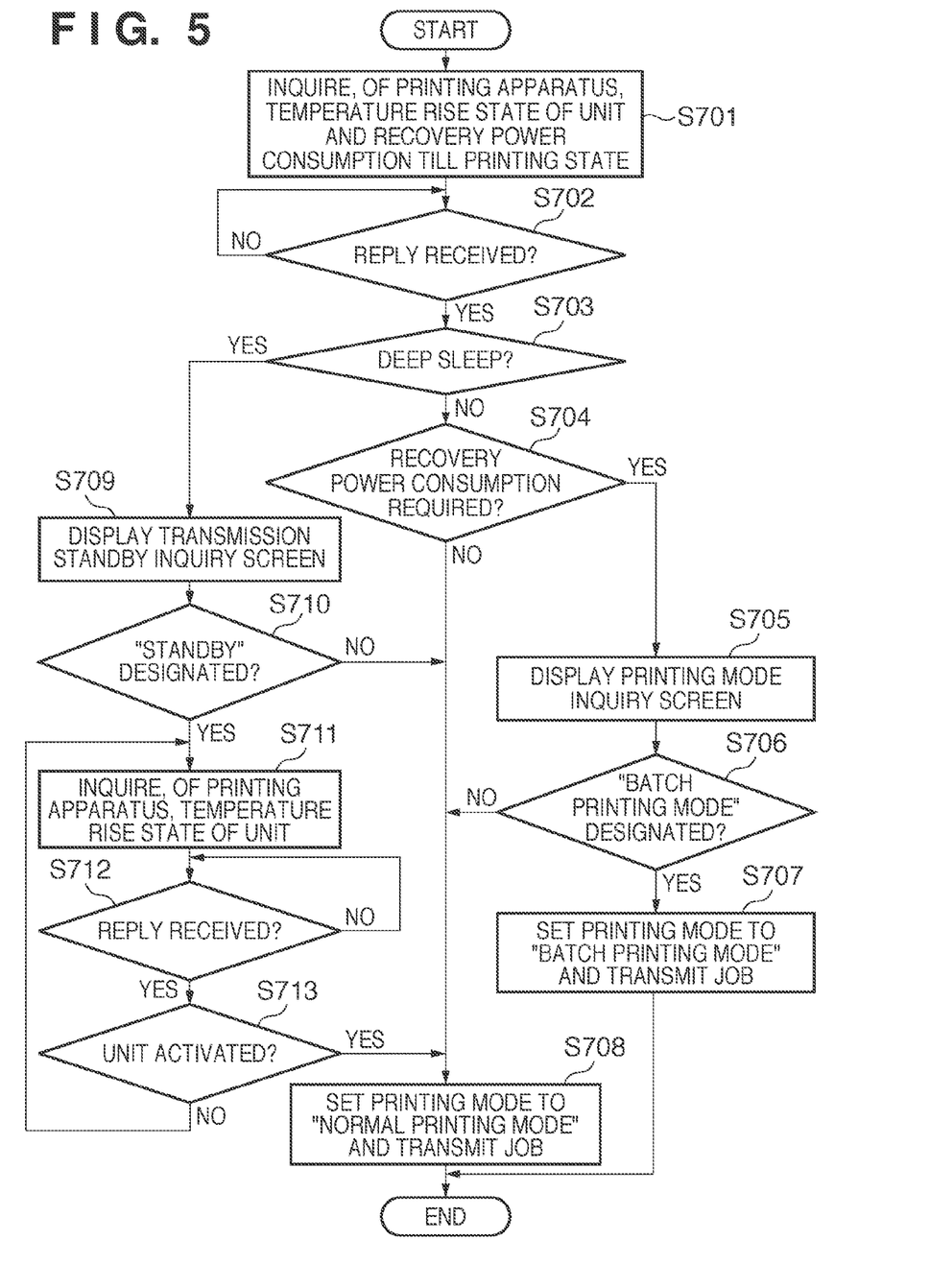
FIG. 5 is a flowchart that depicts the operation procedures of an information processing apparatus 100 according to the second embodiment.

In step S701, the output control unit 105 inquires, of a printing apparatus 110, the temperature state of the fixing unit and recovery power consumption till the printing state. In step S702, the output control unit 105 determines whether it has received a reply to the inquiry command from the printing apparatus 110. The output control unit 105 stands by until it receives a reply. The inquiry result can be expressed by, for example:

"FIX-STATUS=DEEP-SLEEP
RECOVER_WH=83"

"FIX-STATUS" is a character string indicating the state of the fixing unit, and "DEEP-SLEEP" is a character string indicating that the printing apparatus is in a so-called deep sleep state in which power supply to the main parts of the controller is stopped. "RECOVER_WH" on the lower line represents the numerical value of a power consumption amount (Wh) used for recovery. This example assumes that power of 1,000 W is kept consumed for 5 min for recovery, and a power consumption amount of 1000×5/60=83 (Wh) is required.

Figure 6:
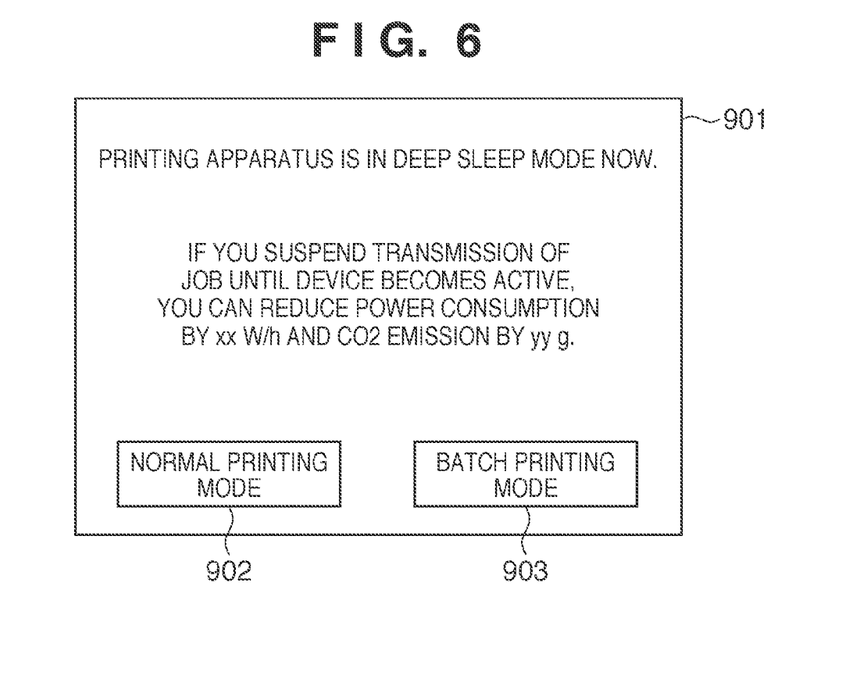
FIG. 6 is a view exemplifying a printing mode inquiry screen.

If the output control unit 105 determines in step S702 that it has received a reply, it determines in step S703 based on the inquiry result whether the printing apparatus is in the deep sleep state. If the output control unit 105 determines that the printing apparatus is in the deep sleep state, it displays a transmission standby inquiry screen via a user interface 103 in step S709, thereby prompting the user to take the next action. FIG. 6 exemplifies this inquiry screen. Reference numeral 901 denotes a display dialog; 902, a normal printing mode selection button; and 903, a batch printing mode selection button. As a power consumption amount xx in the display, "83" in "RECOVER_WH" mentioned above is sent back. A value yy in $CO_2$ emission conversion can also be displayed. The $CO_2$ emission can be calculated from the power consumption amount using a $CO_2$ emission coefficient (0.36 kg-$CO_2$/kWh).

If the output control unit 105 determines in step S710 that the user has selected the "batch printing mode" via the user interface 103, the process advances to step S711. If the user has selected not the "batch printing mode" but the "normal printing mode", the process advances to step S708 to quickly output a job.

The output control unit 105 inquires, of the printing apparatus 110, the temperature rise state of the unit in step S711, and stands by until it receives a reply in step S712. If the output control unit 105 receives the reply and determines in step S713 that the printing apparatus 110 becomes capable of fixing, the process advances to step S708 to send a printing instruction; if NO, returns to step S711 to periodically send an inquiry to the printing apparatus 110. In the printing apparatus 110, only a communication unit 111, fixing state reply unit 116, engine communication unit 117, engine control unit 118, and fixing unit 120 are energized. These units need not perform a complicated calculation because they suffice to send back simple state replies, and can therefore be formed from relatively simple circuits. This enables maintaining the deep sleep state in which power consumption is about several W/h.

The procedures in steps S704 to S708 are the same as those in steps S203 to S207 in the first embodiment. In step S704, the output control unit 105 determines whether recovery power consumption is required. If recovery power consumption is required, the output control unit 105 displays a printing mode inquiry screen in step S705. If the output control unit 105 determines in step S706 that the user has set the "batch printing mode" via the user interface 103, the process advances to step S707; if NO, to step S708. If the output control unit 105 determines in step S704 that no recovery power consumption is required, the process advances to step S708.

In step S708, the output control unit 105 adds attribute information indicating the "normal printing mode" to a printing instruction, and transmits the printing instruction to the printing apparatus, similar to a conventional system. When it is determined in step S704 that no recovery power consumption is required, there is no problem to be solved by the present invention because no power is consumed for recovery. When the user has not designated batch printing in step S706, he gives priority to the printing time in terms of the tradeoff between the printing time and power consumption. Also in this case, printing is done by a conventional method. In step S707, the output control unit 105 adds attribute information indicating the "batch printing mode" to a printing instruction, and transmits the printing instruction to the printing apparatus. That is, when the user does not particularly require urgent output, print processes are executed at once, minimizing power consumption for recovery.

Other Embodiments

The technical scope of the present invention is defined by the scope of the claims, and is not limited by the above-described embodiments.

In the first embodiment, the printing mode inquiry screen is displayed in step S204, and the printing mode is selected via the user interface 103 in step S205. However, another method may be adopted.

For example, it is possible to select the "batch printing mode" when data received in step S202 contains "FIX-STATUS=COLD", and the "normal printing mode" when data received in step S202 contains "FIX-STATUS=WARM".

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium). In this specification, the term "printing" not only includes the formation of significant information such as characters and graphics, but also broadly includes the formation of images, figures, patterns, and the like on a printing medium, or the processing of the medium, regardless of whether they are significant or insignificant and whether they are so visualized as to be visually perceivable by humans.

Also the term "printing medium" not only includes a paper medium used in general printing apparatuses, but also broadly includes media capable of accepting ink, such as cloth, a plastic film, a metal plate, glass, ceramics, wood, and leather.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-218001 filed Sep. 18, 2009 and 2010-159168 filed Jul. 13, 2010 which are hereby incorporated by reference herein in their entirety.

What is claimed is:

1. A system comprising a printing apparatus which performs print processing on a printing medium, and an information processing apparatus which transmits a printing instruction to said printing apparatus,
    said information processing apparatus comprising:
    a first reception unit configured to receive status information of said printing apparatus from said printing apparatus;
    a display unit configured to display, based on the status information that has been received by said first reception unit, a screen for selecting one of a first printing mode in which said printing apparatus performs print processing corresponding to a received printing instruction even when a number of printing instructions stored in said printing apparatus does not exceed a predetermined number, and a second printing mode in which said printing apparatus performs print processing corresponding to a plurality of printing instructions stored in said printing apparatus when a number of the plurality of printing instructions stored in said printing processing apparatus exceeds the predetermined number; and
    a first transmission unit configured to transmit, to said printing apparatus, the printing instruction to which attribute information indicating a printing mode selected on the screen displayed by said display unit is added, and
    said printing apparatus comprising:
    a second transmission unit configured to transmit the status information of said printing apparatus to said information processing apparatus;
    a second reception unit configured to receive the printing instruction to which the attribute information is added from said information processing apparatus and store the received printing instruction in said printing apparatus; and
    a control unit configured to control to, in a case where the attribute information added to the printing instruction received by said second reception unit indicates the first printing mode, perform print processing corresponding to the printing instruction received by said second reception unit even when the number of the printing instructions stored in said printing apparatus does not exceed the predetermined number, and in a case where the attribute information added to the printing instruction received by said second reception unit indicates the second printing mode, perform print processing corresponding to the plurality of printing instructions stored in said printing apparatus when the number of the plurality of printing instructions stored in said printing apparatus exceeds the predetermined number.

2. The system according to claim 1, wherein said control unit, even when the number of the plurality of printing instructions stored in said printing apparatus does not exceed the predetermined number in the second printing mode, performs print processing corresponding to the plurality of printing instructions received by said second reception unit upon lapse of a predetermined time after storing a printing instruction first.

3. The system according to claim 1, wherein
said printing apparatus further comprises a fixing unit configured to fix a printing material onto the printing medium, and a temperature measurement unit configured to measure a temperature of said fixing unit, and wherein the status information that is transmitted by said second transmission unit is information corresponding to the temperature of said fixing unit that is measured by said temperature measurement unit.

4. The system according to claim 1, wherein the status information is information indicating a power state of said printing apparatus.

5. The system according to claim 1, wherein the status information is information indicating a power consumption amount necessary to return said printing apparatus from a sleep state to a normal state.

6. An information processing apparatus which transmits a printing instruction to a printing apparatus that performs print processing on a printing medium, the information processing apparatus comprising:

a reception unit configured to receive status information of the printing apparatus from the printing apparatus;

a display unit configured to display, based on the status information that has been received by said reception unit, a screen for selecting one of a first printing mode in which the printing apparatus performs print processing corresponding to a received printing instruction even when a number of printing instruction stored in the printing apparatus does not exceed a predetermined number, and a second printing mode in which the printing apparatus performs print processing corresponding to a plurality of printing instructions stored in the printing apparatus when a number of the plurality of printing instructions stored in the printing processing apparatus exceeds the predetermined number; and a transmission unit configured to transmit, to the printing apparatus, the printing instruction to which attribute information indicating a printing mode selected on the screen displayed by said display unit is added, wherein the printing apparatus comprising:

a second transmission unit configured to transmit the status information of said printing apparatus to said information processing apparatus;

a second reception unit configured to receive the printing instruction to which the attribute information is added from said information processing apparatus and store the received printing instruction in said printing apparatus; and a control unit configured to control to, in a case where the attribute information added to the printing instruction received by said second reception unit indicates the first printing mode, perform print processing corresponding to the printing instruction received by said second reception unit even when the number of the printing instructions stored in said printing apparatus does not exceed the predetermined number, and in a case where the attribute information added to the printing instruction received by said second reception unit indicates the second printing mode, perform print processing corresponding to the plurality of printing instructions stored in said printing apparatus when the number of the plurality of printing instructions stored in said printing apparatus exceeds the predetermined number.

7. The apparatus according to claim 6, wherein the status information is information indicating a power state of the printing apparatus.

8. The apparatus according to claim 6, wherein the status information is information indicating a power consumption amount necessary to return the printing apparatus from a sleep state to a normal state.

* * * * *